Figure 1:
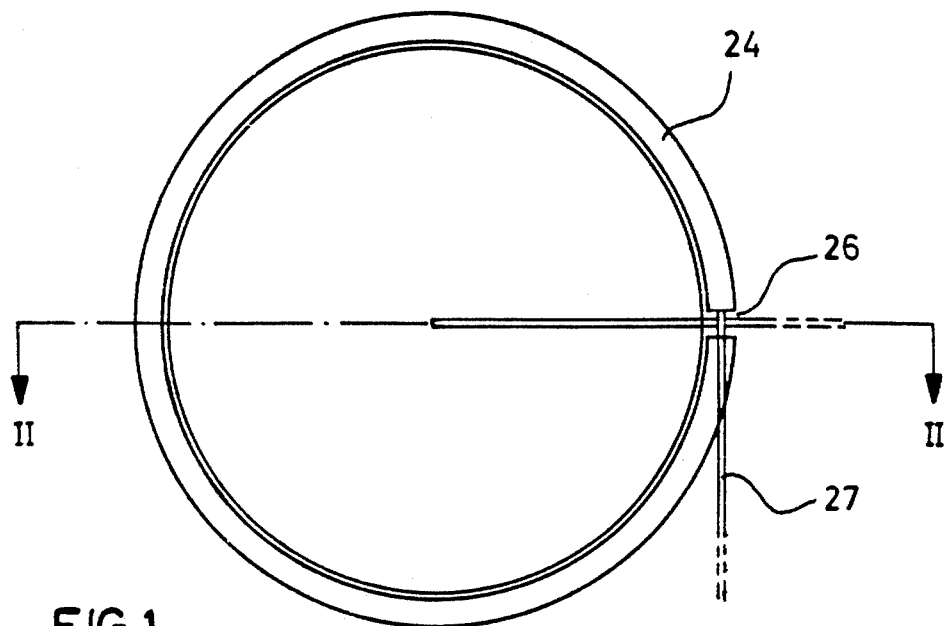

United States Patent [19]

Schmidt

[11] Patent Number: 4,566,135

[45] Date of Patent: Jan. 21, 1986

[54] PRESSURE TRANSDUCER

[76] Inventor: Dieter W. Schmidt, Steinbreite 16a, Goettingen, Fed. Rep. of Germany

[21] Appl. No.: 564,096

[22] Filed: Dec. 21, 1983

[30] Foreign Application Priority Data

Dec. 23, 1982 [DE] Fed. Rep. of Germany ....... 3247843

[51] Int. Cl.$^4$ ............................................... H04B 9/00
[52] U.S. Cl. ..................... 455/614; 455/618; 179/113; 179/121 R; 381/111
[58] Field of Search .................. 455/614, 618; 179/121 R, 113; 381/111

[56] References Cited

U.S. PATENT DOCUMENTS 3,580,082  5/1971  Strack ........................... 179/121 R
4,284,858  8/1981  Nicholson ........................ 455/614

OTHER PUBLICATIONS

Kuhl, W. et al., "Condenser Transmitters and Microphones with Solid Dielectric for Airborne Ultrasonics", Acustica, vol. 4 (1954), pp. 519–532.

Primary Examiner—Robert L. Griffin
Assistant Examiner—Timothy K. Greer
Attorney, Agent, or Firm—Handal & Morofsky

[57] ABSTRACT

A pressure transducer as a microphone comprises a base body with a flat polished surface and a diaphragm contacting the flat surface at a plurality of spaced points. The base body consists of a material transparent for optical radiation, and is provided with means for feed-in of an optical radiation and with a device for feed-out of radiation which has undergone total reflection at those portions of the flat surface which are sufficiently spaced from the diaphragm. The output signal of the transducer depends on the variations of the total reflection caused by variations of the spacing which in turn occur because the diaphragm is more or less strongly forced to the surface of the base body by pressure waves to be detected.

10 Claims, 3 Drawing Figures

PRESSURE TRANSDUCER

BACKGROUND OF THE INVENTION

This invention relates to pressure transducers, as microphones.

A known type of pressure transducer, the "Sell-transducer," comprises a base body having a rough or fluted surface, and a thin, flexible insulating diaphragm, as a plastics film, abutting said surface and bearing a thin metal layer on the side remote of said surface. An air cushion or space formed between said base body surface and the diaphragm allows the diaphragm to oscillate in response to pressure variations, as sound waves, and determines, with other parameters, the resonant frequency of the system. For detecting sound waves having frequencies in the higher ultrasonic range, a small roughness of the base surface is preferred. An electric output signal is generated, similar as in a condensor microphone, by detecting the capacity variations between the conducting surface of the base body and the outer metal layer of the diaphragm (Acustica 4 (1954), 519 to 532).

To operate the known microphone mentioned above, a high d.c. bias or polarization voltage is needed which usually amounts to several hundred volts, and which undesirably stresses the very thin diaphragm to its limit of electric breakdown. Further, the output signal is a relative small voltage originating from a source of relative high impedance. Thus, an impedance transformer has to be provided close to the microphone which is often a source of noise during measurements and which, for its part, needs an own voltage supply.

An object of the present invention is to provide a microphone of the above general type which does need no high polarization voltages and no impedance transformer.

THE INVENTION

In its broadest aspects, the invention provides first and second members having first and second surfaces, respectively. The first member is made of a material transparent for optical radiation, and is provided with means to couple optical radiation into the first member, and said first surface is sufficiently smooth, so that total reflection of at least a portion of said optical radiation occurs at said first surface. At least some portions of said second surface are positioned with a sufficiently close spacing adjacent to said first surface so that a variation of the spacing varies the amount of total reflection of radiation at said first surface. Means are provided to make the spacing pressure-responsive, as by making said second member of a thin resilient material, and means are provided to sense the variations of radiation due to variations of total reflection which in turn depend on the varying spacing.

A pressure transducer according to an embodiment of the present invention needs no polarization voltage, resulting in essential higher stability compared to the state of art. Further, the present pressure transducer primarily supplies an optical output signal which can be transmitted over relative large distances without being disturbed by electric or magnetic fields and which can then be processed at a conveniently accessible place.

The pressure transducer of the invention is especially useful for investigations of flow fields and for flow measurements by means of ultrasonic pulses even under extreme conditions as, for instance, in case of explosion hazard or in strong electric and/or magnetic fields, further in cases of restricted space not admitting impedance transformers and relative thick feeding cables.

IN THE DRAWINGS

Figure 2:
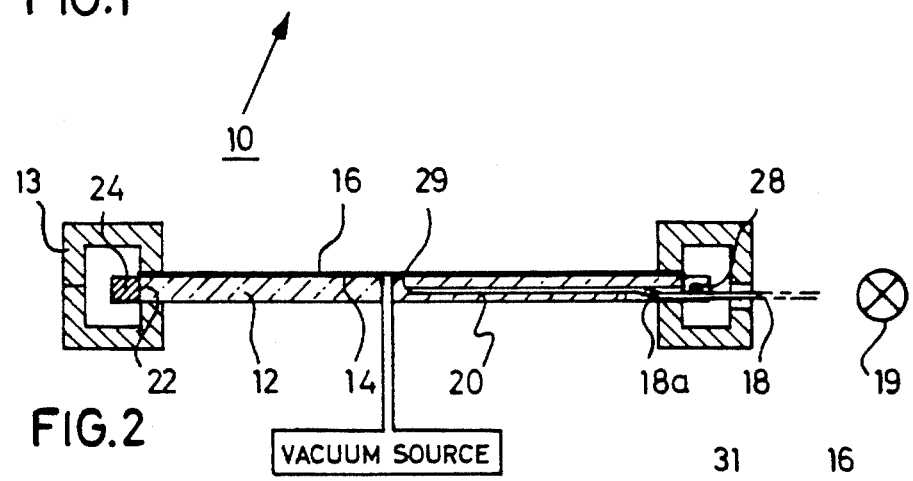
Figure 3:
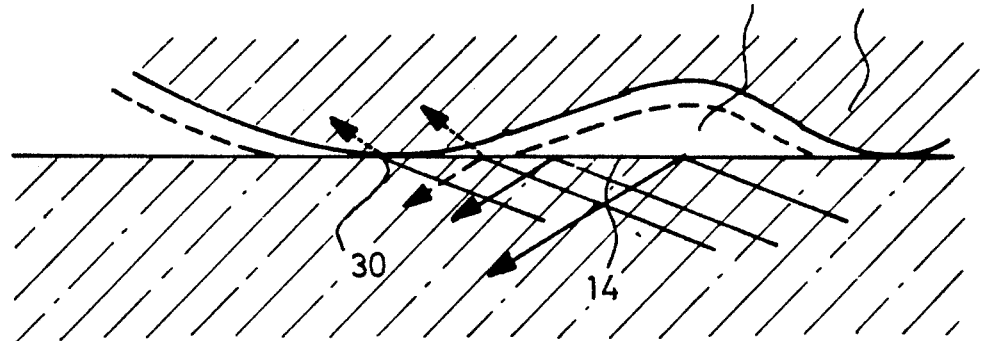

FIG. 1 is a top view of the essential parts of a pressure transducer according to a preferred embodiment of the invention, FIG. 2 is a cross section along a plane II—II of FIG. 1, and FIG. 3 is a greatly enlarged part of FIG. 2.

The pressure transducer shown in the drawings can be regarded as an "optical microphone" and comprises a back plate or base body 12 consisting of a transparent circular disk with smooth and flat main surfaces parallel to each other. One of the main surfaces—the upper one 14 in FIG. 2—is in contact with a thin diaphragm 16 made of a dark—e.g. black—coloured plastics film, e.g. PETP. The outer surface of the diaphragm which is not in contact with the base body 12 may be roughened. Preferably, material of the diaphragm both absorbes and scatters light which enters the diaphragm. Suitable clamp means 13, shown only schematically, may be provided to hold body and membrane in place. The transparent base body 12 is optically coupled to an input light guide 18 in order to introduce an optical input radiation, for which the base body 12 is transparent, into it. In the practical embodiment shown the light guide 18 consists of an optical fiber which is inserted into a radial recess as a bore-hole 20 or a radial slot of the base body, and which ends in its center. At this point the radiation enters the base body from the end of the optical fiber, impinges on a scattering center 29—for instance the rough wall of a bore-hole which ends within the base body,—as bore-hole 20—and propagates then from there by total reflection at the main surfaces of body 12 radially in all directions towards a cylindrical and optically polished circumferential surface 22 of the base body 12. As indicated only schematically, the end of the light guide 18 remote from the base body 12 is coupled to an external source of radiation 19, e.g. a light emitting diode or a laser diode.

The circumferential surface 22 is surrounded by an annular or ring-shaped light collecting body 24 which has a cylindrical outer surface an an inner surface located at close distance from the circumferential surface 22. The surfaces of the light collecting body 24 are optically polished.

The light collecting body 24 consists of a commercially available light collecting ("LISA") plastics material, that is a polymer of high optical purity which comprises a fluorescent dye (see e.g. Bayer Sparte KL, Anwendungstechnik, Anwendungstechnische Information 346/811). The light collecting body 24 is interrupted by a radial cut 26, and one of its end faces formed by the cut is optically coupled to an output light guide 27 which may, for instance, consist of an optical fiber.

The other end face of the light collecting ring 24 is mirror-coated such that the light which arrives there is reflected back, without losses into the ring, which acts as light guide, and is eventually also led to the first mentioned end face and, thus, to the output light guide 27. The mirror-coated end of the light collecting body 24 has a slot 28 to avoid excessive bending of the light guide 27.

The base body may consist, for instance, of a transparent plastic as PMMA, or of an optical glass or quartz glass.

The pressure transducer or optical microphone described operates as follows: The surface of the diaphragm 16 adjacent to the main surface 14 of the base body is not entirely smooth, thus it contacts the main surface 14 essentially only at a plurality of small areas or points 30 randomly distributed all over its area (FIG. 3), so that a thin air space or cushion system 31 is established between the main surface 14 and the adjacent surface of the diaphragm. The optical radiation fed into the base body 12, which impinges on the inner side of the main surface 14 at a sufficiently small angle, is totally reflected, provided that there is an air layer of sufficient thickness at the point of incidence. No total reflection takes place at the points of contact 30, instead the radiation is here able to penetrate into the diaphragm which consists preferably of a dark colored plastic, or another suitable film, in which it is absorbed. Thus, the intensity of the radiation arriving at the circumferential border surface 22 and entering from there into the light collecting body 24 is a function of the total reflection at the main surface 14; it is reduced with increasing area of contact between diaphragm and main surface 14 and vice versa. If sound waves impinge on the outer side of the diaphragm 16, it is forced more or less strongly to the main surface 14, following the rhythm of the wave oscillations, thus, as indicated by dotted lines in FIG. 3, the area of contact varies accordingly. This controls in turn the total reflection and, thus, the intensity of the radiation which, distributed over the whole circumference of the base body, enters the light collecting body 24. In the light collecting body 24, the radiation originating from the base body 12 is converted into fluorescent radiation by means of the excited fluorescent dye. The fluorescent radiation in turn propagates along the light collecting body 24 to the interrupting cut 26 and, thus, is concentrated to a small area and, from there, is coupled out by the light guide 27. Thus, an optical output radiation modulated by the sound oscillations sensed is available at the output end of the light guide 27, which output may be utilized, for instance, by transforming it into an electric signal by means of a photo-transistor or any other optoelectric converter, or by any suitable other means.

In a preferred embodiment of the microphone shown in the drawing, the base body was made of clear PMMA and had a diameter of 50 mm and a thickness of 2 mm. A black coloured metallized PE film (e.g. mylar) of 12 μ thickness was used as the diaphragm.

To enhance reproducible operation, the diaphragm should contact the base body as uniformly as possible across the whole area. This may be effected by several means, for instance electrostatically, pneumatically, or by forming the diaphragm or back plate of an electret. A pneumatic arrangement is preferred at present, wherein the base body is provided with a central borehole through which a reduced pressure of about $2 \cdot 10^4$ Pa is applied. By these means the diaphragm can also prestrained or biased mechanically in order to linearize th output signal.

The embodiment described may be modified in various ways as obvious to those scilled in the art, without leaving the scope of the invention.

E.g. the light which enters the diaphragm 16 may be used for obtaining the output signal, if the diaphragm is made of a LISA plastics material. The fluorescent light excited in such a diaphragm and led to the circumferential border by total reflection could again be fed into an output light guide via a concentrating light collecting ring. The introduction of an optical input radiation into the base body 12 may be performed by irradiating light of suitable wavelength, if the base body also consists of a fluorescent LISA material such that the fluorescent light excited in this material has a wavelength suitable to excite fluorescence in the light collecting body 24. Further, the base body and the diaphragm need not to be exactly circular. The membrane may be made of any suitable material which is sufficiently flexible to respond to pressure variation and is able to vary the amount of radiation reflected by total reflection.

The microphone described may be used generally as pressure sensor.

I claim:

1. A pressure transducer comprising:
   (a) a base body having a plane surface and consisting of a material which is transparent for optical radiation;
   (b) a diaphragm positioned to contact said plane surface at a plurality of spaced regions, the area of which being variable by pressure variations applied to said diaphragm;
   (c) means for coupling optical radiation into said base body so that said radiation impinges on said plane surface and undergoes total reflection at portions of said surface not contacted by said diaphragm;
   (d) means for deriving an output signal in response to a variation of total reflection of said radiation caused by said variation of the area of said regions of contact between said base body surface and said diaphragm.

2. The transducer as claimed in claim 1, wherein said diaphragm is comprised of a film which absorbs the optical radiation.

3. The transducer as claimed in claim 1, characterized by a light guide (18) optically coupled to said base body (12) for feeding-in said optical radiation from an external source of radiation (19).

4. The pressure transducer as claimed in claim 3, wherein said light guide (18) is an optical fiber inserted in a groove (20) of the base body such that it is located essentially parallel to said surface (14).

5. The pressure transducer as claimed in claim 1, characterized in that said base body (12) is optically coupled to a light collecting body (24) which contains a fluorescent material.

6. The pressure transducer as claimed in claim 5, wherein said base body is an essentially circular plate with two flat main surfaces and a cylindrical smooth peripheral surface (22), said light collecting body (24) is of annular shape and has a cylindrical inner surface (22) which is located adjacent to the cylindrical peripheral surface of the base body, and the light collecting body (24) is coupled to an output light guide (2).

7. The pressure transducer as claimed in claim 1, characterized by means for biasing the diaphragm to said surface of the base body.

8. The pressure transducer as claimed in claim 7, characterized by said biasing means comprises means for applying reduced pressure between the diaphragm and said surface of the base body.

9. A pressure transducer comprising base body of optically clear material and having first and second parallel flat surfaces and a cylindrical circumferential surface, said surfaces being optically polished; a bore extending from said circumferential surface parallel to said flat surfaces to an end within said body; light scattering means at said end of said bore; a light guide extending into said bore; a flexible member abutting said first surface at a plurality of spaced regions, the area of which varying in response to pressure variations acting on said flexible member, and an annular body of a clear transparent material comprising a substance subject to excitation to fluorescence by said optical radiation, said annular body having a first surface adjacent and optically coupled to said circumferential surface of said base body, and a second surface adapted to receive fluorescent radiation emitted by said substance, and optical output means coupled to said second surface to receive said fluorescent radiation.

10. The pressure transducer as claimed in claim 9, wherein said flexible member is a film of electret material; said annular body has two opposed end faces formed by a radial gap, said output means being coupled to one of said end faces, and the other end face being provided with a reflective coating.

* * * * *